United States Patent
Ackley et al.

(10) Patent No.: US 10,883,879 B2
(45) Date of Patent: Jan. 5, 2021

(54) IDENTIFICATION OF MATERIAL COMPOSITION

(71) Applicant: International Business Machines Corporation, Armonk, NY (US)

(72) Inventors: Sean M. Ackley, Raleigh, NC (US); Aaron R. Cox, Tucson, AZ (US); Jason E. Minyard, Phoenix, AZ (US); Gerard F. Muenkel, Raleigh, NC (US); Joni E. Saylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/888,644

(22) Filed: Feb. 5, 2018

(65) Prior Publication Data

US 2018/0156662 A1    Jun. 7, 2018

Related U.S. Application Data

(62) Division of application No. 13/532,387, filed on Jun. 25, 2012, now abandoned.

(51) Int. Cl.
*B07C 5/34* (2006.01)
*G01J 3/46* (2006.01)

(52) U.S. Cl.
CPC .............. *G01J 3/46* (2013.01); *B07C 5/34* (2013.01); *B07C 5/3412* (2013.01); *Y10T 428/24802* (2015.01)

(58) Field of Classification Search
CPC ........ B07C 5/34; B07C 5/3412; B07C 5/342; B07C 5/3422; B07C 2501/0045; B07C 2501/0054; G01J 3/46; G06K 9/00026; G06K 9/34; G06K 9/342; G06K 9/60; G06K 2009/2045; G06K 9/46; Y10T 428/24802
See application file for complete search history.

(56) References Cited

U.S. PATENT DOCUMENTS

| | | | |
|---|---|---|---|
| 3,358,552 A | | 12/1967 | Schneider |
| 4,644,151 A | * | 2/1987 | Juvinall ................ B07C 5/3408 235/494 |
| 5,201,921 A | | 4/1993 | Luttermann et al. |
| 5,794,788 A | * | 8/1998 | Massen .................. B07C 5/126 209/524 |

(Continued)

FOREIGN PATENT DOCUMENTS

| | | |
|---|---|---|
| JP | 2002240037 A | 8/2002 |
| JP | 2008209128 A | 9/2008 |
| WO | WO 2018/182437 A1 * 4/2018 ............... B07C 5/34 |

OTHER PUBLICATIONS

Wilhelm, R., Resin Identification Codes, ASTM International—Standards Worldwide, Sep./Oct. 2008.

(Continued)

*Primary Examiner* — Joseph C Rodriguez
(74) *Attorney, Agent, or Firm* — Lieberman & Brandsdorfer, LLC

(57) ABSTRACT

Identification of a material composition. The material composition is configured with a sequential pattern applied to one or more surfaces of the body. The sequential pattern identifies the specific material composition. A discrete section or sub-section of the material is analyzed, after which the discrete section or sub-section may be sorted for recycling.

20 Claims, 5 Drawing Sheets

(56) References Cited

U.S. PATENT DOCUMENTS

| | | | |
|---|---|---|---|
| 5,908,165 A | 6/1999 | Guschall et al. | |
| 6,043,445 A * | 3/2000 | Gigliotti, Jr. | B07C 5/3425 209/580 |
| 6,359,216 B1 | 3/2002 | Liu | |
| 6,459,821 B1 * | 10/2002 | Cullen | G06K 9/6203 345/178 |
| 6,563,119 B1 | 5/2003 | Zoidis | |
| 6,610,981 B2 | 8/2003 | Sommer, Jr. | |
| 6,633,795 B1 * | 10/2003 | Suzuki | G06K 17/00 700/213 |
| 7,366,360 B2 * | 4/2008 | Takiguchi | G06T 3/4038 348/36 |
| 7,763,820 B1 | 7/2010 | Sommer, Jr. et al. | |
| 8,553,838 B2 | 10/2013 | Sommer et al. | |
| 8,574,384 B1 | 11/2013 | Lee | |
| 8,874,257 B2 | 10/2014 | Sinram et al. | |
| 8,875,901 B2 * | 11/2014 | Wellwood | B07C 5/368 209/552 |
| 8,937,282 B2 * | 1/2015 | Owen | G01N 23/2252 250/306 |
| 9,194,745 B2 * | 11/2015 | Ackley | G01J 3/46 |
| 9,316,537 B2 * | 4/2016 | Bamber | G01J 3/00 |
| 9,405,992 B2 * | 8/2016 | Badholm | B07C 5/3412 |
| 9,443,179 B2 * | 9/2016 | Meadows | G06K 19/06037 |
| 9,989,463 B2 * | 6/2018 | Skaff | G01N 21/55 |
| 10,369,598 B2 * | 8/2019 | Kerver | G06K 7/10712 |
| 2004/0044436 A1 | 3/2004 | Arleth et al. | |
| 2004/0169847 A1 | 9/2004 | Dukler | |
| 2005/0065820 A1 * | 3/2005 | Mallett | B07C 7/005 705/2 |
| 2006/0163492 A1 * | 7/2006 | Mennicken | G06K 7/12 250/483.1 |
| 2007/0138064 A1 | 6/2007 | Feraudy et al. | |
| 2007/0259174 A1 | 11/2007 | Albanese et al. | |
| 2009/0194465 A1 | 8/2009 | Toida et al. | |
| 2009/0200212 A1 | 8/2009 | Hachin et al. | |
| 2010/0222917 A1 | 9/2010 | Bohlig et al. | |
| 2013/0184855 A1 | 7/2013 | Chen et al. | |
| 2013/0292303 A1 | 11/2013 | Prahlad et al. | |
| 2013/0344297 A1 | 12/2013 | Ackley et al. | |
| 2017/0225199 A1 * | 8/2017 | Koistinen | B65F 1/0006 |
| 2018/0345323 A1 * | 12/2018 | Kerver | B07C 5/3412 |

OTHER PUBLICATIONS

Science Daily, Quantum Dot, Aug. 12, 2007, ScienceDaily LLC, https://web.archive.org/web/20070812230612/http://sciencedaily.com/articles/q/quantum_dot.htm.

List of IBM Patents or Applications Treated as Related, Feb. 2018.

* cited by examiner

IDENTIFICATION OF MATERIAL COMPOSITION

CROSS REFERENCE TO RELATED APPLICATION(S)

This application is a divisional patent application claiming the benefit of the filing date of U.S. patent application Ser. No. 13/532,387 filed on Jun. 25, 2012, and titled "Identification of Material Composition" now pending, which is hereby incorporated by reference.

BACKGROUND OF THE INVENTION

Technical Field

The present invention relates to a method and system for identifying a composition of a material. More specifically, the invention relates to a method and system that analyzes a pattern sequence applied to the material and employs the analyzed pattern sequence to identify the material composition.

Description of the Prior Art

The art of recycling addresses converting used materials into new products to prevent waste and pollution associated with product disposal. One aspect of recycling includes identification of the material to be recycled, as different materials may be subject to different recycling processes. Recyclable materials include items such as glass, paper, metal, plastic, textile, etc., each of which may be subject to different processes of recycling. Accordingly, separation of materials based on the material composition is an aspect of the recycling process.

A current state of the art engraves a material code into the product material, with the code identifying the material composition with an associated number. This code is employed in the material separation process, and provides efficiency separation in that material compositions can be identified and sorted based on the engraved number. Problems in product recycling arise when the material code is not attached to or otherwise embedded in the product or product material. Post-consumer materials are often intentionally or unintentionally disassembled or broken before they are sorted. Many fragmented pieces of material are left absent the material code, causing the piece's compositions to be unidentifiable and thus unrecyclable.

SUMMARY OF THE INVENTION

This invention comprises a system for identifying the composition of a material.

In one aspect, the system is provided with a platform and an identification module. The platform is utilized to carry or transport a body having a material composition with a layer and a pattern sequence applied across substantially the entire layer of the material. In one embodiment, the platform carries or transports a fragment of the body containing the layer, with the fragment being a subset of the body. The identification module functions to analyze the pattern sequence of the fragment. The pattern sequence is either a recognizable or unrecognizable pattern sequence. In response to the pattern sequence of the fragment being unrecognizable, the identification module combines the fragment with at least one additional fragment to create a recognizable pattern sequence. The identification module functions to identify a composition of the material based on the pattern sequence analysis.

In another aspect, a system is provided to analyze and identify a composition of material. A body having a material composition with a layer and a pattern sequence repetitively applied across substantially the entire layer of the material is provided. A subset of the body in the form of a fragment that contains the layer is selected. The fragment includes the pattern sequence with a tactile application of the pattern. An identification module is provided to analyze the pattern sequence of the fragment, and to identify a composition of the material in response to the pattern sequence analysis.

Other features and advantages of this invention will become apparent from the following detailed description of the presently preferred embodiment of the invention, taken in conjunction with the accompanying drawings

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Figure 1:
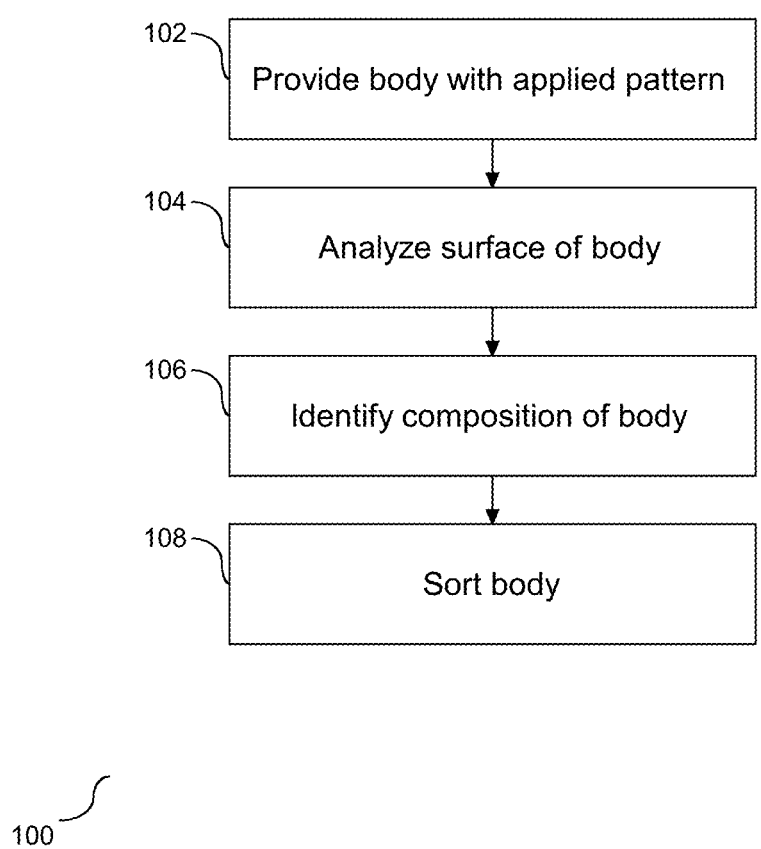
FIG. 1 depicts a flow chart depicting a process for identifying a composition of a body based upon a pattern applied to a layer of the body.

Products comprised of plastic material are commonly recycled following disposal of the product. Although the description herein pertains to plastic materials that are eligible for recycling, the scope of the embodiments may be expanded to include other categories of recyclable materials. FIG. 1 is a flow chart (100) illustrating a process for identifying a composition of a body based upon a pattern applied to a layer of the body. A material composition is provided in the form of a body having a sequential pattern applied to a layer of the body (102). In one embodiment, the application of the pattern takes place during the material molding process. The sequential pattern is associated with a specific material composition. Specifically, and as described below, different categories of material have different sequential patterns, such that the pattern associates the category of the material with a composition of the material. For example, triangles arranged to form a repeating set of hexagons may be associated with a first category of plastic material that is recycled through a first recycling process. Triangles arranged to form a repeating set of pyramids may be associated with a second category of plastic material that is recycled through a second recycling process, etc.

The sequential pattern applied to the material may be comprised of the same color spectrum as the material, or a different color. In one embodiment, the pattern sequence has a color identifier to aid in the detection of the material composition of the body. The color identifiers may be used to aid in the distinction of material compositions or may be used to signify varying compositions having like patterns. For example, a pattern sequence having blue triangles arranged to form a repeating set of hexagons may be associated with a first category of plastic material that is recycled through a first recycling process whereas a pattern sequence having red triangles arranged to form a repeating set of hexagons may be associated with a second category of plastic material that is recycled through a second recycling process. In another embodiment, the pattern sequence has a tactile application to aid in the detection of the material composition of the body. This includes the pattern sequence having risen or embedded surfaces applied to the body.

During the recycling process, the body may be broken down into multiple bodies, such that what was originally an internal surface of the body and non-visible from the outside, may become visible. More specifically, the body to be analyzed may be a secondary body that has been separated or otherwise severed from a primary body. By applying a repeating pattern on a substantial surface of the material of the body, the composition of the secondary body may be identified at a later point in time.

The sequential pattern may be applied to one surface of the body, or to more than one surface. For example, where the sequential pattern applied to the body is on both a first external surface and a second external surface, the sequential pattern is separately applied to each of these surfaces of the body, with the first and second external surfaces being different surfaces or walls of the body. In one embodiment where the sequential pattern is applied to two different surfaces, the first and second surfaces may be oppositely disposed external surfaces of the body or adjacently mounted surfaces. The pattern applied to a second surface of the body acts as a back-up for analysis provided the pattern on the first surface is unidentifiable or not provided on a primary or secondary body. At the same time, the sequential pattern applied to an external surface of the original body, may deteriorate from exposure to the environment. By applying the sequential pattern to at least two surfaces, the preservation of the pattern on at least one of the surfaces increases. In one embodiment, the pattern is applied to one of the internal layers as well as an external layer of the body such that a breaking down of the body to cause the external pattern to become unidentifiable can simultaneously cause the internal layer to become visible for analysis. Accordingly, applying a sequential pattern to more than one surface of a body increases the likelihood of successfully analyzing the pattern sequence applied to the body and identifying a composition of the body.

The surface of the body having the applied sequential pattern is analyzed (104). In one embodiment, the surface of the body having the pattern is optically exposed, such that analysis of the surface having the pattern utilizes an optical wavelength in the visible range. In another embodiment, the section of the body to be analyzed is randomly selected. The random selection of a section of the body for analysis is due to the separation of material fragments in the recycling process. For example, a secondary body may be the only section of the body present for analysis at a given time. An analysis is defined to be successful when the sequential pattern is recognized by the analyzer as a match with a previously known pattern.

A composition of the body is identified in response to a successful pattern analysis (106). Specifically, a recognized pattern associated with a body is linked to a known composition, thereby linking the body with the known composition. As with the analysis (104), the identification (106) may take place with the naked eye or with a tool. For example, if the applied pattern sequence is microscopic, a tool may be employed to read the sequence and thereby identify the pattern sequence.

Once identified, the body is sorted (108) based on an identified composition of the body. The sorting at step (108) places the analyzed body of the material with like materials and like compositions. Sorting of materials commonly takes place in the art of recycling. Each identified body may be sorted for proper recycling, thereby mitigating waste and improper disposal of the identified body.

Figure 2:
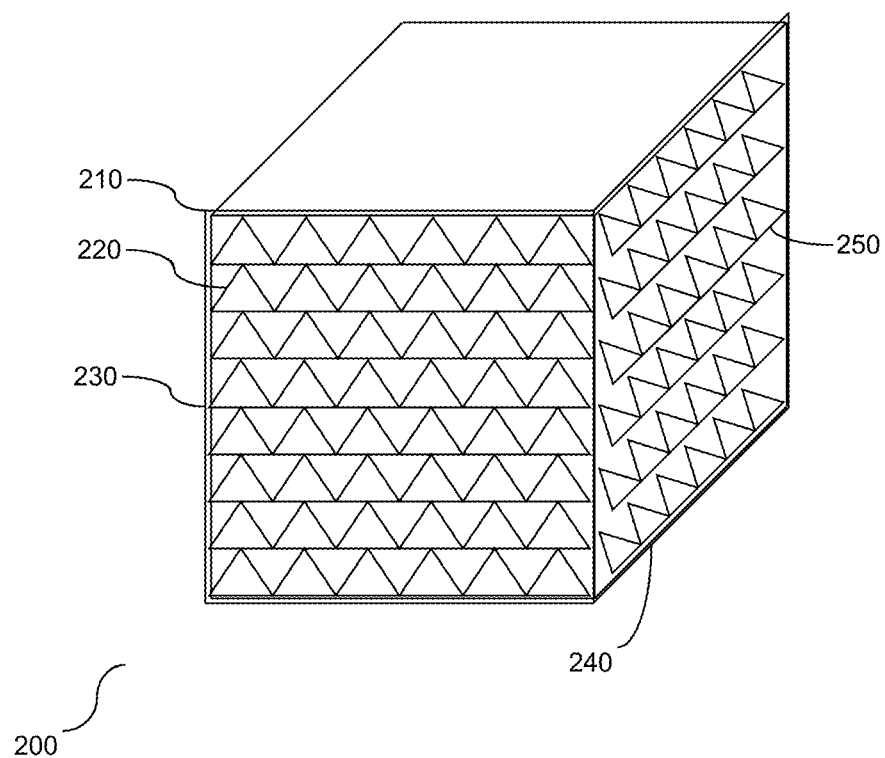
FIG. 2 depicts a block diagram depicting a material composition in the form of a body with a pattern across a first surface of the body.

FIG. 2 is a block diagram (200) illustrating a material composition in the form of a body (210) with a pattern (220) across at least a first surface (230) of the body (210). Specifically, the composition includes a material having a single composition, and the applied sequential pattern (220) covering substantially an entire first surface (230) of the material. The pattern (220) is applied on the first surface (230) of the body (210) such that the pattern (220) would still be identifiable despite macroscopic fracturing of the body (210). Specifically, the pattern (220) remains recognizable on a fracture of the body (210) containing at least one sequence of the applied pattern (220). In another embodiment of the invention, the pattern (220) on a fracture of the body (210) containing less than one sequence of the applied pattern can still be identified by combining the fracture with other similar body fractures to create a sequence of the identifiable pattern (220).

A recyclable container commonly includes a body to hold a secondary item. The body may come in different shapes and sizes, and may form an enclosure. Specifically, the walls of the container body are comprised of a material that includes two external and visible surfaces. Although the second surface of the container may not be readily visible in the container form, the second surface may become visible when the container is broken apart for disposal purposes. To facilitate identification of the body or a fracture of the body, the sequential pattern (250) is shown in FIG. 2 applied to a second surface (240), e.g. an oppositely disposed layer to the first layer. Accordingly, the sequential pattern may be applied to the first surface (230), the second surface (240), or both the first and second surfaces (230) and (240).

Figure 3:
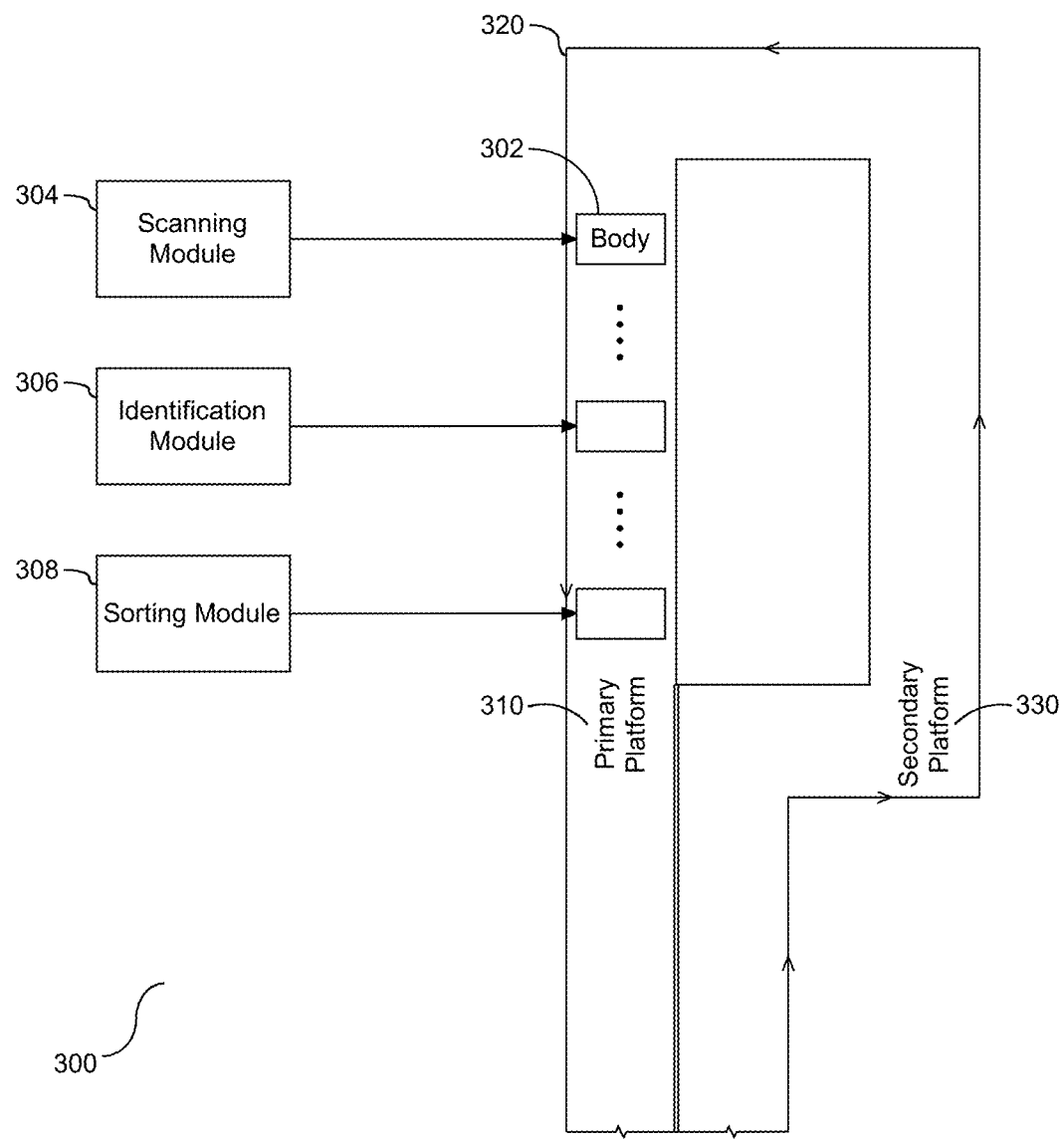
FIG. 3 depicts a system employed to identify the composition of the body.

FIG. 3 is a block diagram (300) for a system employed to identify the composition of the body. The system provides a primary platform (310) for carrying a body (302), the body described in detail in FIG. 2, as well as a scanning module (304) to observe the pattern applied to the body by scanning the body and creating an image of the applied pattern based on the scan. In one embodiment, the scanning module (304) creates a separate image for each exposed surface of the body. An identification module (306) is provided in communication with the scanning module to conduct image analysis on the image of the scanned body. The identified pattern (220) corresponds with a specific composition such that the identification module (306) identifies a composition of the body from the identified pattern (220). In one embodiment, the scanning module (304) creates separate images for each exposed surface of the body, and the identification module (306) analyzes each image separately. Accordingly, the scanning module (304) functions with the identification module (306) to acquire and ascertain a sequential pattern attached to one or more surfaces of a body.

The identification module (306) may combine more than one pattern scanned by the scanning module (304) for analysis and identification of the acquired pattern. In one embodiment, the body is moved to a second platform (330) for re-scanning if the identification module (306) does not identify an associated pattern. In another embodiment, a body with an unidentified pattern is sorted with materials also containing no identified pattern. Accordingly, the scanning and identification modules (304) and (306) read the layer of the body to identify an applied pattern, and thereby identify a material composition of the body.

A sorting module (308) is provided in communication with the primary platform (310). The sorting module (308) sorts the body based on an identified composition of the material. This sorting process compiles materials of like composition. In one embodiment of the invention, the secondary platform (320) carries the body for processing to the scanning module (304) the identification module (306), and the sorting module (308). The sorting of the material allows for recycling of the material with like compositions.

Figure 4:
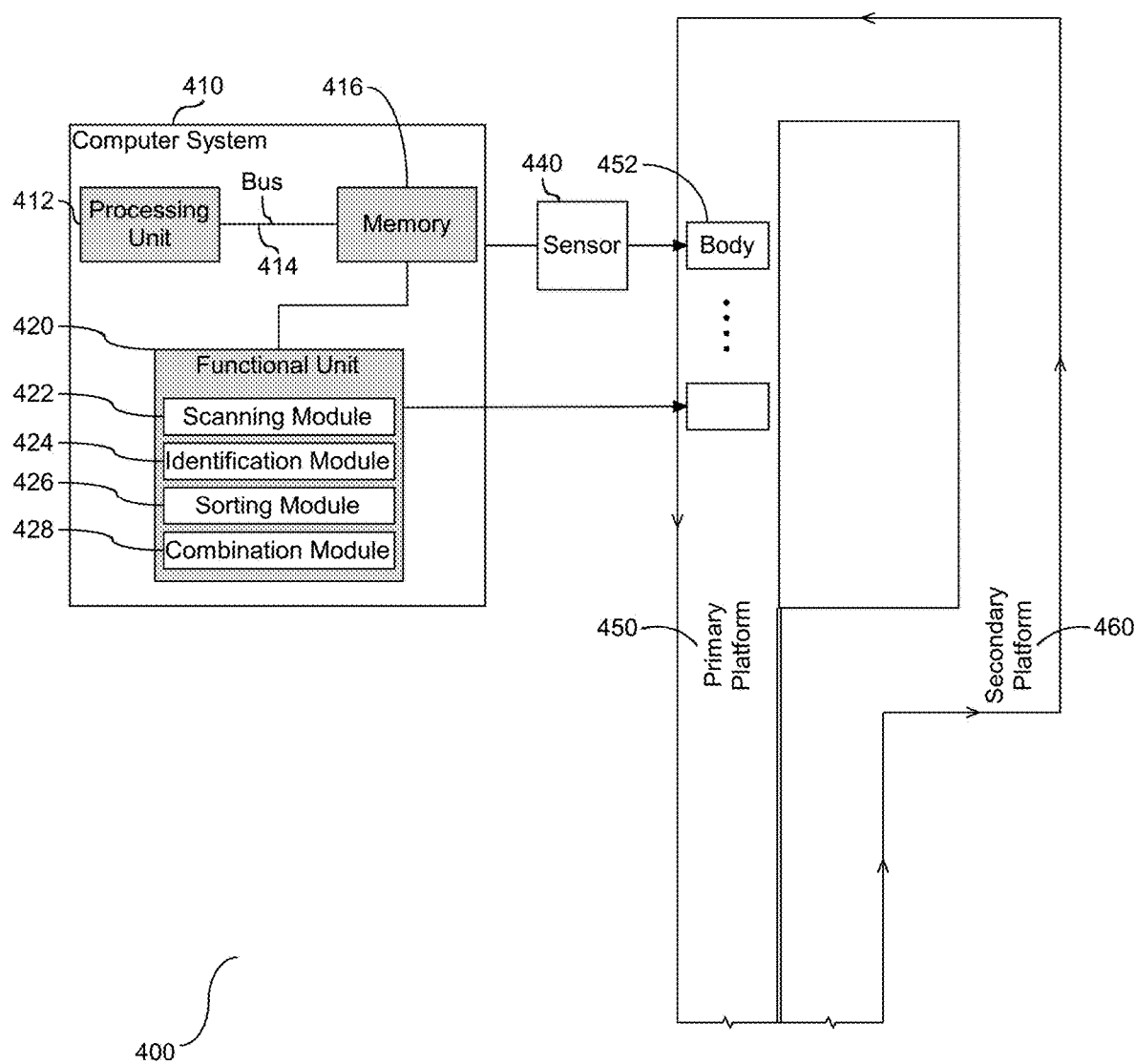
FIG. 4 depicts a block diagram illustrating tools embedded in a system to support automated assessment of the material composition of a body.

As demonstrated in FIG. 3, a plurality of modules may be employed to scan the body, analyze the image scan, and based upon the visual assessment sort the material. FIG. 4 is a block diagram (400) illustrating tools embedded in a system to support automated assessment of the material composition of a body. For illustrative purposes, a computer system (410) is provided in communication with a primary platform (450). The computer system (410) is provided with a processing unit (412) in communication with memory (416) across a bus (414). The computer system (410) is shown in communication with a sensor (440). In one embodiment, the sensor (440) may be a part of or in communication with the primary platform (450). A functional unit (420) is provided in communication with memory (416). The functional unit (420) supports management of material identification.

The sensor (440) functions in communication with the primary platform (450), and more specifically to read and detect presence of the body (452) on the primary platform (450). In one embodiment, each body of material (452) is a discrete element. The functional unit (420) is shown herein with tools for management of identification of the material of the body (452). Specifically, the tools include, but are not limited to, a scanning module (422), an identification module (424), and a sorting module (426). The sensor (440) is in communication with the scanning module (424) to ascertain the presence of the body (452) in the primary platform.

As explained herein, the scanning module (422) is in communication with the sensor (440) and functions to identify presence of the body of material (452) on the primary platform (450). In response to the visibility of the body of material (452), the scanning module (422) creates a scanned image for analysis. The identification module proceeds to analyze the pattern sequence as shown in the scanned image to identify a recognized pattern.

In one embodiment, a secondary platform (460) is provided in communication with the primary platform (450), with the secondary platform (460) provided to accept a transfer of material bodies that have not attained a scanned image with a recognizable pattern. Similarly, in one embodiment, the transferred bodies may be subject to a repeat exposure to the scanning and identification modules (422) and (424), respectively, or a scanning of a different disposed surface of the body (452).

In another embodiment, a combination module (428) is included in the functional unit, provided in communication with the scanning module (422) and the identification module (424). In the event the scanning module (422) does not identify a pattern associated with a body, the combination module (428) systematically combines multiple image scans taken of the body by the scanning module (422). A pattern is identified by the identification module (424) from the combined image scans. In one embodiment, if a pattern is still not identified by the identification module (424), the scanning module (422) takes additional image scans of the body to be further combined by the combination module (428) and analyzed by the identification module (424).

Once an identified pattern is attained from a scanned image, the identification module (424) identifies a composition associated with the identified pattern. The sorting module (426), in communication with the identification module, sorts the body associated with the identified composition. In one embodiment, a body in which the identification module (424) could not identify an associated pattern is sorted by the sorting module (426) with like bodies in which the identification module (424) could not identify a pattern.

The sensor (440) is provided in communication with the scanning and identification modules (422) and (424), respectively, of the functional unit (420). More specifically, the sensor (440) detects presence of the material on the primary platform (450), and in one embodiment, the secondary platform (460). The detected presence of the material initiates scanning of the detected material by the scanning module (422), following by image analysis by the identification module (424) to identify the applied pattern covering a layer of the body. The identification of the pattern supports sorting of the material. Accordingly, as shown herein, tools in the form of modules are provided to assess presence of a pattern on a layer of the body, and identify the applied pattern to enable proper sorting of the material body responsive to identification of the material composition of the body.

As identified above, the scanning module (422), identification module (424), sorting module (426), and combination module (428), hereinafter referred to as tools, function as elements to dynamically assess the material composition of a body. The tools (422)-(428) are shown residing in memory (416) local to the computing device (410). However, the tools (422)-(428) may reside as hardware tools external to the memory (416), or they may be implemented as a combination of hardware and software. Similarly, in one embodiment, the tools (422)-(428) may be combined into a single functional item that incorporates the functionality of the separate items. As shown herein, each of the tools (422)-(428) are shown local to the computing device (410). However, in one embodiment they may be collectively or individually distributed across a network or multiple machines and function as a unit to dynamically assess and manage material identification. Accordingly, the tools may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
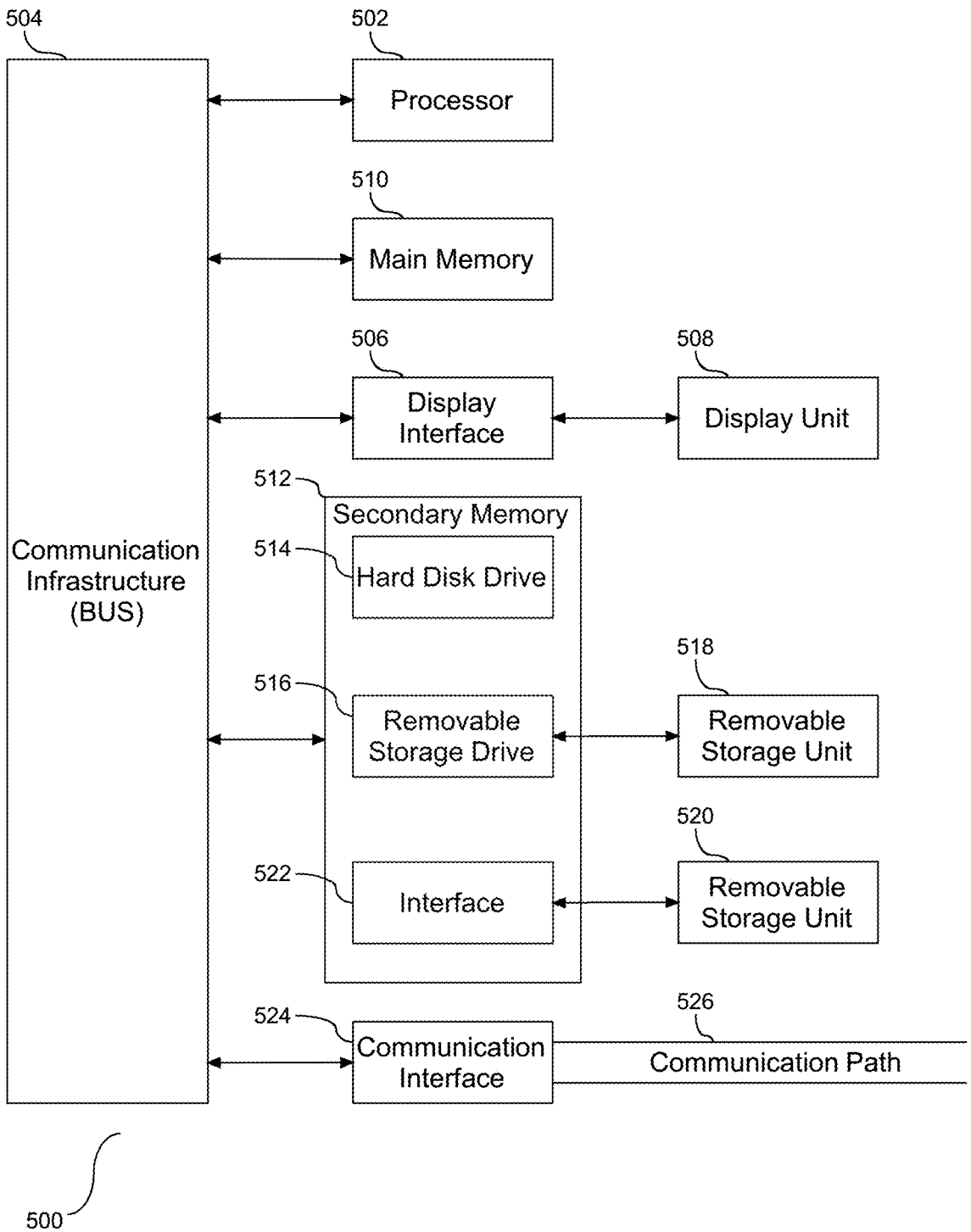
FIG. 5 depicts a block diagram showing a system for implementing an embodiment of the present invention.

Referring now to the block diagram of FIG. 5, additional details are now described with respect to implementing an embodiment of the present invention. The computer system includes one or more processors, such as a processor (502). The processor (602) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516). As will be appreciated, the removable storage unit (518) includes a computer readable medium having stored therein computer software and/or data.

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) are in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

What is claimed is:
1. A system comprising:
a platform to carry a body having a material composition with a layer and a pattern sequence repetitively applied across substantially an entire layer of the material, including a fragment of the body containing the layer, wherein the fragment is a subset of the body;
an identification module to analyze the pattern sequence of the fragment, the pattern sequence comprising a recognizable pattern sequence or an unrecognizable pattern sequence, wherein responsive to the pattern sequence of the fragment being unrecognizable, the identification module to combine the fragment with at least one additional fragment to create the recognizable pattern sequence; and the identification module to identify a composition of the material responsive to the pattern sequence analysis.

2. The system of claim 1, further comprising a sorting module in communication with the identification module to sort the fragment responsive to the identified composition.

3. The system of claim 1, wherein the pattern sequence analysis of the fragment includes utilization of an optical wavelength in a visible range.

4. The system of claim 1, further comprising the pattern sequence having a color identifier to facilitate detection of the material composition.

5. The system of claim 1, further comprising the pattern sequence having a tactile composition, wherein the tactile composition is applied to a raised or embedded pattern sequence surface.

6. The system of claim 1, wherein the fragment of the body is randomly selected.

7. The system of claim 1, wherein the body comprises a first surface and a second surface.

8. The system of claim 7, wherein the pattern sequence is applied to the first surface of the body.

9. The system of claim 7, wherein the pattern sequence is applied to the second surface of the body.

10. The system of claim 7, wherein the pattern sequence is applied to the first surface of the body and the second surface of the body.

11. A system comprising:
for a body having a material composition with a layer and comprising at least one of a raised pattern sequence or an embedded pattern sequence repetitively applied across substantially an entirety of the layer, the pattern sequence having a tactile composition, a selected fragment of the body containing the layer, wherein the selected fragment is a subset of the body;
an identification module to analyze the pattern sequence of the selected fragment, the pattern sequence having a tactile composition, wherein responsive to the pattern sequence of the selected fragment being unrecognizable by the identification module, the identification module to combine images of the pattern sequence of the selected fragment and the pattern sequence of at least one additional fragment to render the pattern sequence of the selected fragment and the at least one additional fragment recognizable to the identification module; and
the identification module to identify the material composition of the selected fragment responsive to the pattern sequence analysis.

12. The system of claim 11, further comprising a sorting module in communication with the identification module to sort at least the selected fragment responsive to the identified composition.

13. The system of claim 11, wherein the pattern sequence analysis of at least the selected fragment includes utilization of an optical wavelength in a visible range.

14. The system of claim 11, further comprising the pattern sequence having a color identified to aid in the detection of the material composition of the body.

15. The system of claim 11, wherein the body comprises a first surface and a second surface, and wherein the pattern sequence is applied to the first surface of the body and the second surface of the body.

16. A system comprising:
a platform to carry fragments of a body having a material composition and a pattern sequence repetitively applied across substantially an entirety of a layer of the body, wherein the fragments of the body are a subset of the body;
an identification module to analyze the pattern sequence of the fragments, wherein responsive to the pattern sequence of a plurality of the fragments being unrecognizable to the identification module, the identification module to combine images of the plurality of the fragments to render the pattern sequence of the plurality of fragments recognizable to the identification module; and
the identification module to identify material composition of the plurality of the fragments responsive to the pattern sequence analysis.

17. The system of claim 16, further comprising a sorting module in communication with the identification module to sort the fragments responsive to the identified material composition.

18. The system of claim 16, wherein the pattern sequence analysis of the fragments includes utilization of an optical wavelength in a visible range.

19. The system of claim 16, further comprising the pattern sequence having a color identified to aid in the detection of the material composition of the body.

20. The system of claim 16, wherein the pattern sequence comprises a raised pattern sequence, an embedded pattern sequence, or a combination thereof.

* * * * *